United States Patent [19]
van den Berg

[11] Patent Number: 5,792,964
[45] Date of Patent: Aug. 11, 1998

[54] MILKING SYSTEM INCLUDING A MILK QUANTITY METER

[75] Inventor: Karel van den Berg, Bleskensgraaf, Netherlands

[73] Assignee: Maasland N.V. a Dutch limited liability company, Maasland, Netherlands

[21] Appl. No.: 620,216

[22] Filed: Mar. 22, 1996

[30] Foreign Application Priority Data

Jan. 6, 1995 [NL] Netherlands .................... 1000471
Mar. 24, 1995 [NL] Netherlands .................... 9500566

[51] Int. Cl.⁶ .................... G01F 11/00; A01J 5/00
[52] U.S. Cl. .................... 73/861.15; 73/223; 119/14.17
[58] Field of Search .................... 73/861.04, 861.08, 73/861.15, 223; 119/14.08, 14.15, 14.17, 14.38

[56] References Cited

U.S. PATENT DOCUMENTS

| | | | |
|---|---|---|---|
| 2,898,549 | 8/1959 | Miller | 119/14.15 |
| 3,242,729 | 3/1966 | Keller | 73/861.08 |
| 3,547,080 | 12/1970 | Russell | 119/14.14 |
| 3,989,009 | 11/1976 | Robar et al. | 119/14.08 |
| 4,292,926 | 10/1981 | Tilman | 119/14.02 |
| 4,433,577 | 2/1984 | Khurgin et al. | 73/290 |
| 4,530,465 | 7/1985 | Gauchet et al. | 239/127 |
| 4,572,104 | 2/1986 | Rubino | 119/14.02 |
| 4,574,736 | 3/1986 | Tanaka et al. | 119/14.08 |
| 4,616,215 | 10/1986 | Maddelena | 340/626 |
| 4,756,274 | 7/1988 | Rubino | 119/14.08 |
| 4,797,666 | 1/1989 | Baxter et al. | 340/606 |
| 4,922,855 | 5/1990 | Tomizawa et al. | 119/14.08 |
| 5,012,955 | 5/1991 | Shannon | 222/61 |
| 5,046,510 | 9/1991 | Ams et al. | 73/861.08 |
| 5,245,946 | 9/1993 | Hoefelmayr et al. | 119/14.15 |

FOREIGN PATENT DOCUMENTS

| | | |
|---|---|---|
| 0426266 A1 | 5/1991 | European Pat. Off. . |
| 0509288 A1 | 10/1992 | European Pat. Off. . |
| 2124877 | 2/1984 | United Kingdom . |

OTHER PUBLICATIONS

International Search Report (PCT) for Netherlands Application No. 9500566, filed Mar. 24, 1995, which is in Dutch.

*Primary Examiner*—Richard Chilcot
*Assistant Examiner*—Harshad Patel
*Attorney, Agent, or Firm*—Penrose Lucas Albright

[57] ABSTRACT

A quantity meter for determining the quantity of liquid flowing through a line is provided with at least two electrically conducting elements arranged in the line spaced from each other and being in communication with an electronic circuit. This electronic circuit determines the quantity of liquid which has flowed through the line on the basis of the electric conductivity of the liquid, the length of the interval of time during which a unit of milk passes between the two electrically conducting elements, the distance between the electrically conducting elements, the rate of flow of the liquid and the specific electrical resistance.

19 Claims, 2 Drawing Sheets

MILKING SYSTEM INCLUDING A MILK QUANTITY METER

FIELD OF THE INVENTION

The present invention relates to a quantity meter for determining the quantity of liquid flowing through a line. According to the invention, there can be obtained a simple and reliable quantity meter, when the latter is provided with at least two electrically conducting elements, arranged in the line at some distance from each other, and being in communication with an electronic circuit, in which, on the basis of the electric conductivity (G) of the liquid measured by the electronic circuit, the rate of flow (v) of the liquid and the specific electric resistance (Rsw), there is determined the quantity (V) of liquid flowed through. Although the rate of flow (v) of the liquid may be determined by means of calibration, this rate of flow is preferably determined in the quantity meter itself. The rate of flow will depend on the liquid (the viscosity), the differences in pressure in the line system, etc. Therefore, according to the invention, the quantity meter may also be designed including at least three electrically conducting elements, arranged in the line at some distance from each other, and in the electronic circuit, on the basis of the retardation of time ($\Delta T$) between the moments when the liquid flowing through the line makes an electric connection between the respective electrically conducting elements, there may be determined the rate of flow (v) of the liquid. In a particular embodiment, the electronic circuit comprises a microprocessor, in which, on the basis of the rate of flow (v) of the liquid, the values of the interval of time ($\Delta t$) during which the conductivity of the liquid is measured and the electric conductivity (G) measured in the electronic circuit, and the value of the specific electric resistance (Rsw) obtained by means of calibration, the quantity (V) of liquid flowed through is at least approximately determined by the relation $V = Rsw.l.v.G.(\Delta t + l/v)$, wherein 1 is the distance between two electrically conducting elements in the line. When the specific electric resistance of the liquid is unknown or varies to some extent due to the composition of the liquid, the quantity meter may be provided with a conductivity sensor included in the line, by means of which sensor there is permanently effected a calibration for the purpose of determining the specific electric resistance of the liquid flowing through the line. This conductivity sensor may comprise a liquid collecting reservoir to be included in the line, in which reservoir there are disposed two electrically conducting elements, being in communication with a further electronic circuit, in which, on the basis of the distance between these electrically conducting elements, the volume of the liquid in the liquid collecting reservoir and the conductivity of the liquid measured, there is determined the specific electric resistance. In a particular case, one of the electrically conducting elements connected to the electronic circuit may be in communication with one of the electrically conducting elements of the conductivity sensor. The further electronic circuit may then be integrated in the electronic circuit, in which the quantity of liquid flowed through during the fixed time is determined. In this way, it will be possible to design the quantity meter in a simple manner as one single unit.

The aforementioned difference in time ($\Delta t$) may be determined by recording in the electronic circuit the electric conductivity between two electrically conducting elements at the moment when the liquid stream reaches an electrically conducting element that, seen in the direction of flow, is situated more rearwardly, and the electric conductivity between these two electrically conducting elements at the moment when the liquid stream has passed the electrically conducting element that, seen in the direction of flow, is situated more forwardly, and by calculating thereafter the difference between these moments. When the liquid stream pulsates through the line, in the microprocessor the quantity of each of these liquid pulsations will be calculated and on the basis thereof, by means of summation, the total quantity thereof.

In a preferred embodiment, each of the electrically conducting elements is constituted by a junction tube, and the junction tubes are kept apart from each other at a fixed mutual distance, by means of a further junction tube made of an electrically non-conducting material and having an internal diameter corresponding to that of the electrically conducting junction tubes. In particular, the junction tubes may be included in a tube of synthetic material, while, preferably at a relatively short distance from these junction tubes, the conductivity sensor pertaining to the quantity meter is included in this tube.

According to a further aspect of the invention, the above-described quantity meter may be applied in an implement for milking animals, such as cows. Not only the specific electric resistance of the milk of the various animals will differ, said resistance may also differ upon subsequent milking runs with one and the same animal, for example because a latent mastitis has occurred. This specific electric resistance may even change in value during milking an animal, which happens in particular with foremilk having in general a lower specific electric resistance than the milk stream to be obtained thereafter. Moreover, upon milking, the milk stream is obtained pulsationwise and depending on the pulsation frequency at which the milking takes place.

In a first embodiment, the implement for milking animals is provided with teat cups capable of being connected to the teats of the animals, and a buffer vessel, such as a milk glass, for collecting the milk obtained via the teat cups, while in the milk lines, by means of which the teat cups are connected to the buffer vessel, there is included a quantity meter of the above-described type. In this manner, the quantity of milk obtained from the separate udder quarters of the animal can be determined, and, if required, by means of a conductivity sensor included in the quantity meter, upon determining the quantity of milk obtained from an udder quarter, the specific electric resistance of the milk, changing during the milking run, can be taken into account. In a second embodiment, the implement may be provided with teat cups capable of being connected to the teats of the animals, a buffer vessel, such as a milk glass, for collecting the milk obtained via the teat cups, and a milk tank connected to the buffer vessel, while in the line between the buffer vessel and the milk tank there is included a quantity meter of the above-described type. Although, on the one hand, in the latter embodiment, the quantities obtained per udder quarter cannot be determined separately, and, due to the fact that the milk is collected in a buffer vessel, a change in the specific electric resistance of the milk during the milking run cannot be taken into account, on the other hand, said embodiment has the advantage that, due to the fact that in the buffer vessel there is effected a separation between air and milk, the total quantity of milk can be determined accurately by means of only one quantity meter, while the milk can be discharged from the buffer vessel to the milk tank in one single pulsation.

The application of a quantity meter of the above-described type in an implement for milking animals is particularly important, when this implement is provided with a computer and is equipped for automatically milking the animals, and is additionally provided with a milking robot for automatically connecting the teat cups to the teats of an animal, respectively disconnecting same therefrom. In that case, the electronic circuits pertaining to the quantity meter may be integrated in the computer.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENTS

Figure 1:
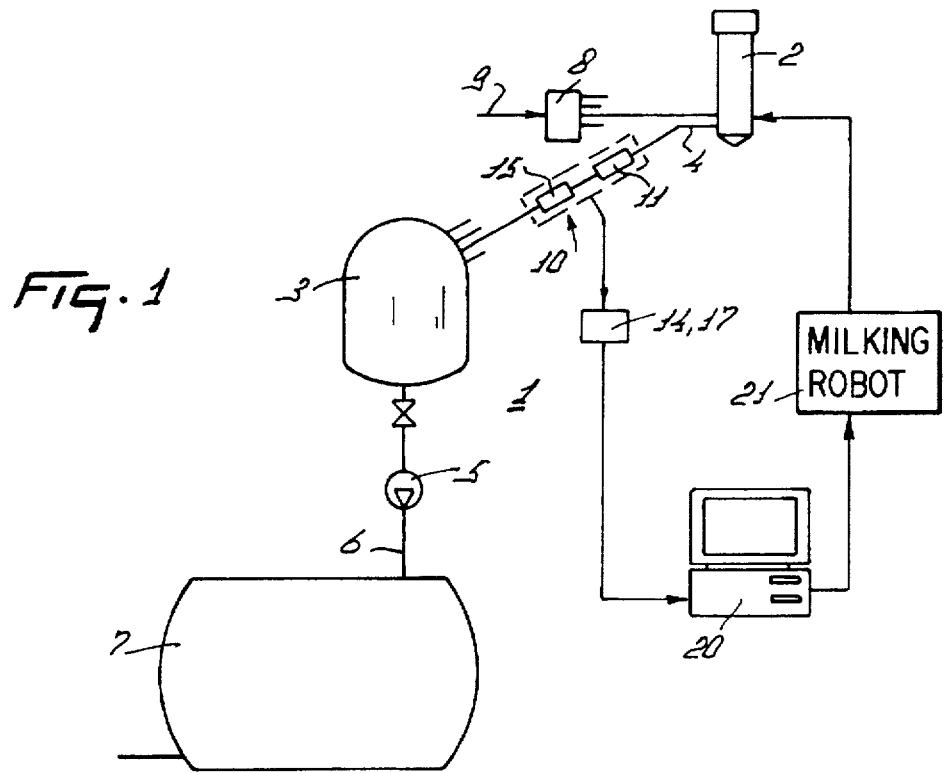
FIG. 1 shows schematically an implement for milking animals.

In FIG. 1 there is represented a milking installation 1 for an implement for automatically milking an animal, while, for the sake of simplicity, there is indicated only one teat cup 2. Furthermore, there is provided a buffer vessel constituted by a milk glass 3. The milk yielded per udder quarter by means of the teat cups 2 is supplied to the milk glass 3 via a separate milk line 4. From the milk glass 3 the milk is supplied, by means of a pump 5, via a milk discharge line 6, to a milk tank 7. Moreover, the milking installation comprises a pulsation system 8 for the four teat cups 2. The vacuum line 9 for the pulsation system 8 is connected to a vacuum pump including a balance tank.

Figure 2:
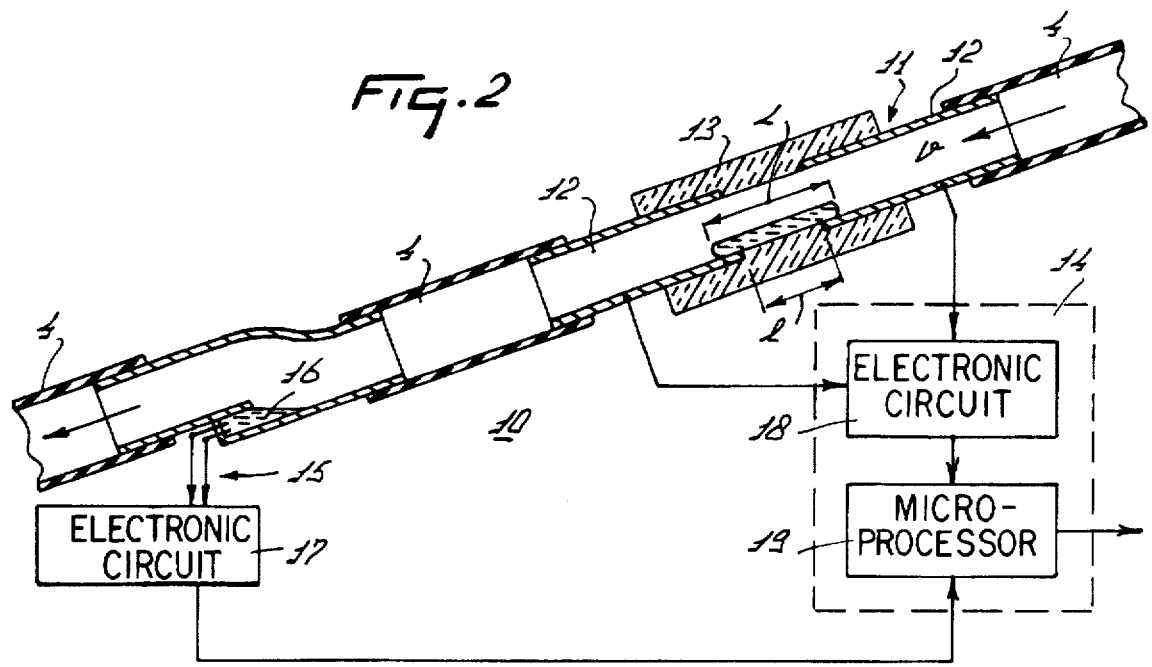
FIG. 2 shows the quantity meter according to the invention.

In the milk line 4 there is included the quantity meter 10 according to the invention. This quantity meter comprises in this case a sensor 11 that is sensitive to flow for the purpose of ascertaining when the milk stream starts and when it ends. The sensor 11 operates on the basis of an electric connection to be made by means of a milk stream between two electrically conducting elements (electrodes). The line 4 extends obliquely downwards so as to prevent milk from remaining behind between the electrodes, in other words, to prevent a pool of milk from staying behind therebetween, as this would result in a permanent detection of a milk stream. In the embodiment shown (FIG. 2), each of the electrodes is constituted by a junction tube 12, which junction tubes are kept at a mutual distance l from each other by means of a further junction tube 13 made of an electrically non-conducting material. The internal diameter of this junction tube 13 corresponds to that of the junction tubes 12, so that the junction tubes 12 and 13 constitute together one tubular body having a uniform internal diameter. The line 4, in which this tubular body is included, is preferably made of synthetic material. The two electrically conducting junction tubes 12 are in communication with an electronic circuit 14. As soon as there is made an electric connection between the junction tubes 12 by means of a pool of milk, this moment is recorded in the electronic circuit 14. When, thereafter, the electric connection between the junction tubes 12 is broken due to the fact that the pool of milk moves along, this moment is recorded in the electronic circuit 14 as well. In other words, in the electronic circuit 14 there is determined the interval of time $\Delta t$ during which there is an electric connection between the two junction tubes. When the length of the pool of milk amounts to L and the rate of flow thereof amounts to v, there is ascertained an electric current during an interval of time $\Delta t=(L-l)/v$. The size of this current is determined by the electric conductivity G of the milk between the two junction tubes 12. The electronic circuit 14 is equipped for ascertaining this electric conductivity G, for which applies that $G=A/(Rsw.l)$, while Rsw is the specific electric resistance of the milk and A is the cross-section, perpendicular to the direction of flow, of the pool of milk. In order to check how much milk passes a fixed point in the line, not only the interval of time $\Delta t$, but also the time required for bridging the distance l between the junction tubes 12 is to be taken into consideration. Therefore, during a time $\Delta t+l/v$ there flows milk having an electric conductivity G along a fixed point through the line 4. For the product $G.(\Delta t+l/v)$ it applies, while $\Delta t=(L-l)/v$ and $G=A/(Rsw.l)$, that $G.(\Delta t+l/v)=A.L/(Rsw.l.v.)$. The pool of milk flowing along equalling $V=A.L$, it applies that: $V=Rsw.l.v.G.(\Delta t+l/v)$. This relation gives a good approach of the quantity of liquid flowing through the line 4 during a fixed time. In the electronic circuit 14 there are determined G and $\Delta t$. Furthermore, l is a known geometric quantity, while v and Rsw may be determined by means of calibration. A preferable way of determination of the rate of flow (v) will be described hereafter with the aid of FIG. 3. When the quantity meter is used for a homogeneous liquid, i.e. a liquid having a constant Rsw value, the flow sensor 11 may be used with the electronic circuit 14 as a quantity meter. Of each pool of liquid, at a constant Rsw value, the value V can easily be calculated; in the case of subsequent pools of liquid, these values of course have to be summed. However, in case of a milk stream, Rsw varies, both with the animals to be milked successively, and even during milking of one individual animal; the foremilk has an other electric conductivity than the subsequent milk stream. Under these circumstances, it is important to be able to ascertain permanently, during milking, the Rsw value. Therefore, the quantity meter 10 comprises a further conductivity sensor 15 included in the line 4 (FIGS. 1 and 2), in which sensor the electric conductivity of a known quantity of milk is permanently measured. In the embodiment shown, this sensor 15 is included in the line 4 relatively closely after the sensor 14. The sensor 15 comprises a space 16, which, during milking, constantly contains a known volume of milk. To the electrodes debouching into this space 16 there is connected an electronic circuit 17, in which the electric conductivity of the milk in the space 16 is measured and the value of the specific resistance Rsw is permanently calculated. During flowing through the line 4, the composition of the milk may change, at least as far as it concerns the electric conductivity, while the composition of the milk in the space 16 may change as well. Therefore, by means of the electronic circuit 17, the actual Rsw value is permanently supplied to the electronic circuit 14, so that the correct quantity of each pool of milk can be determined therein. For the sensor 15 there may be used, if required, a mastitis sensor based on measuring the electric conductivity. The electronic circuit 17 may be integrated in the circuit 14. Besides the further electronics 18, the circuit 14 may comprise a microprocessor 19. Furthermore, instead of a separate microprocessor 19, there may be used the computer 20 provided for the automatic milking system; the quantity sensor will then constitute part thereof.

Figure 3:
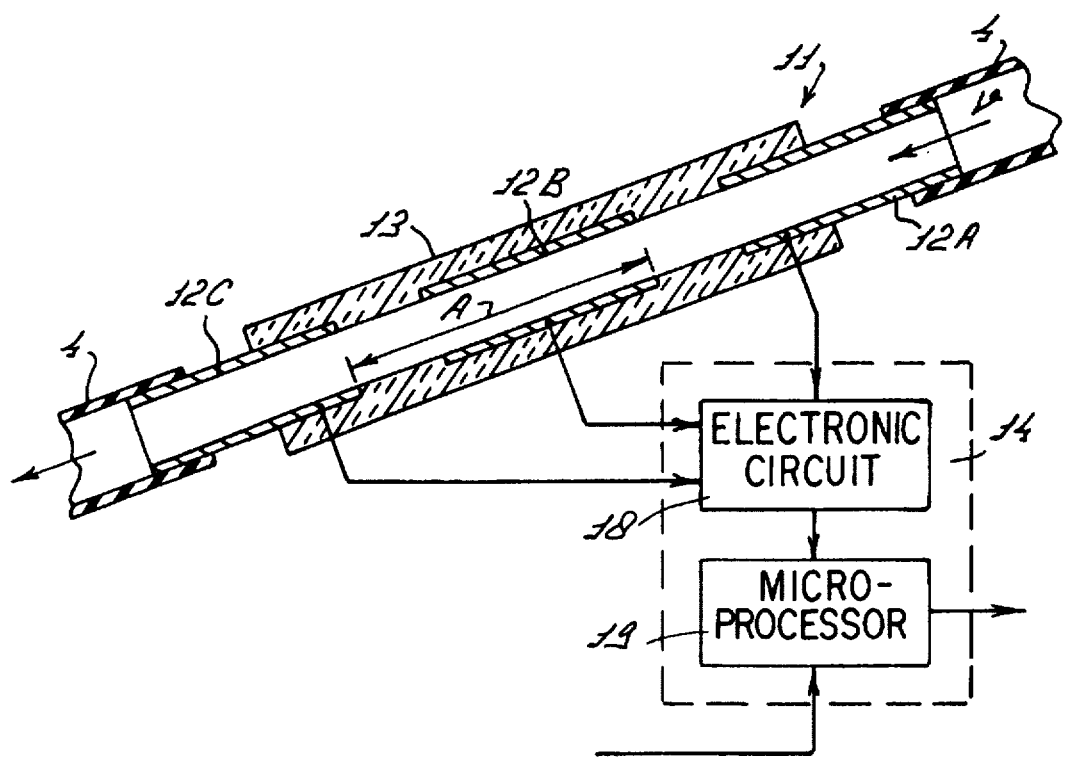
FIG. 3 shows part of the quantity meter in a design in which the rate of flow of the liquid is determined therein.

As is already mentioned before, the quantity meter should preferably be designed so as to make it possible that therein the rate of flow (v) of the liquid can be determined as well. For that purpose, as is shown in FIG. 3, the electrically conducting elements are constituted by three junction tubes 12A, 12B and 12C, which, by means of a junction tube 13 made of a non-conducting material, are kept apart at a fixed mutual distance in the same manner as the two junction tubes 12 in the embodiment shown in FIG. 2. Also in this case, the junction tubes 12A, 12B, 12C and 13 constitute together one tubular body having a uniform internal diameter. The junction tubes 12A, 12B and 12C are in communication with the electronic circuit 14. As soon as a pool of milk bridges the junction tubes 12A and 12B, there will be ascertained an electric connection in the electronic circuit 14. The moment when this connection is made will be recorded in the electronic circuit. When, thereafter, the pool of milk bridges the junction tubes 12B and 12C, also then there will be ascertained an electric connection by the electronic circuit 14 and the moment when this connection is made will be recorded therein. On the basis of the retardation of time ($\Delta T$), determined by these two moments, and the distance A, constituted in FIG. 3 by the length of the junction tube 12B and the distance between the junction tubes 12B and 12C, there can be determined in the electronic circuit the rate of flow of the liquid according to the relation $v=A/\Delta T$.

The above-described quantity meter 10 may in particular be applied in an implement for automatically milking animals, such as cows, which implement is provided with a milking robot 21 (FIG. 1), controlled by the computer 20, for automatically connecting teat cups 2 to the teats of an animal, and respectively disconnecting same therefrom. Especially in such an implement, in the absence of permanent human supervision, it is important to have a reliable quantity meter at one's disposal. The quantity of milk obtained from the separate quarters can continually be updated, so that there is realized at the same time a regular control of the state of health of the udder. The invention is by no means restricted to the embodiment shown, but also relates to all kinds of alternatives, in particular those indicated in the introduction of the description, of course, falling within the scope of the following claims.

Having disclosed my invention, what I claim as new and to be secured by Letters Patent of the United States is:

1. A quantity meter for determining the quantity of liquid flowing through a line in pulsations:

said quantity meter comprising a first electronic circuit and first, second and third electrically conducting elements;

said first, second and third electrically conducting elements arranged linearly in said line spaced sequentially apart from each other; and each of said electrically conducting elements being in communication with said first electronic circuit; and wherein, on the basis of of:

the electric conductivity (G) of the liquid measured by said first electronic circuit, the rate of flow (v) of the liquid pulsations, and the specific electric resistance ($R_{SW}$) of the liquid, there is determined the quantity (V) of liquid flowing through said line, and, wherein, in said electronic circuit, on the basis of time ($\Delta T$) between the instants when the liquid pulsations flowing through the line make an initial electric connections between said first and said second electrically conducting elements and between said second and said third electrically conducting elements, said rate of flow (v) of the liquid pulsations is determined.

2. A quantity meter as claimed in claim 1, wherein said first electronic circuit comprises a microprocessor, via said microprocessor, on the basis of said rate of flow (v) of the liquid pulsations, the values of the interval of time ($\Delta t$) during which the conductivity of the liquid is measured and said electric conductivity (G) measured in said first electronic circuit, and the value of said specific electric resistance ($R_{SW}$) obtained by means of calibration, said quantity (V) of liquid flow though is approximately determined by the relation $V=R_{SW} \cdot l \cdot v \cdot G \cdot (\Delta t + l/v)$, l being the distance between two of said electrically conducting elements in said line.

3. A quantity meter as claimed in claim 2, wherein in said microprocessor said quantity (V) of each of the liquid pulsations is calculated and, on the basis thereof, by means of summation, the total quantity ($V_{tot}$) of said liquid pulsations is determined.

4. A quantity meter as claimed in claim 1, further comprising:

a conductivity sensor included in said line, by means of said conductivity sensor there is effected a calibration for the purpose of determining said specific electric resistance ($R_{SW}$) of the liquid flowing through said line.

5. A quantity meter as claimed in claim 4, wherein said conductivity sensor comprises a liquid collecting reservoir included in said line, in said liquid collecting reservoir there are disposed two further electrically conducting elements, said two further electrically conducting elements being in communication with a further electronic circuit, via said further electronic circuit, on the basis of the distance between said further electrically conducting elements, the volume of the liquid in said liquid collecting reservoir and the conductivity of the liquid measured, said specific electric resistance ($R_{SW}$) is determined.

6. A quantity meter as claimed in claim 5, wherein one of said first, second or third electrically conducting elements communicating with said first electronic circuit is in communication with one of said two further electrically conducting elements of said conductivity sensor.

7. A quantity meter as claimed in claim 5, wherein said further electronic circuit is integrated in said first electronic circuit, in which said quantity (V) of liquid flowed through during said interval of time ($\Delta t$) is determined.

8. A quantity meter as claimed in claim 1, wherein said first, second and third electrically conducting elements comprise two rearward electrically conducting elements and a forward electrically conducting element and the difference in time ($\Delta t$) is determined by recording in said first electronic circuit the electric conductivity between said two rearward electrically conducting elements at the moment when the liquid stream electrically connects said two rearward electrically conducting elements which, in respect to the direction of flow, are situated more rearwardly than said forward electrically conducting element, and the electric conductivity between said two first electrically conducting elements at the moment when the liquid stream has passed said forward electrically conducting element and said second electrically conducting element which, in respect to the direction of flow, are situated more forwardly than said two rearward electrically conducting elements, and by calculating thereafter the difference between these moments.

9. A quantity meter as claimed in claim 1, wherein each of said first, second and third electrically conducting elements comprises a junction tube, and said junction tubes are spaced apart from each other at a fixed mutual distance (l), by means of a further junction tube made of a substantially electrically non-conducting material and having an internal diameter corresponding to that of said first-mentioned electrically conducting junction tubes.

10. A quantity meter as claimed in claim 9, wherein said junction tubes are included in a tube of synthetic material, and, at a relatively short distance from these junction tubes, a conductivity sensor is included in said tube of synthetic material, so that by means of said conductivity sensor said specific electric resistance ($R_{SW}$) of the liquid flowing through said line is calibrated.

11. A quantity meter as claimed in claim 10 wherein said conductivity sensor comprises a liquid collecting reservoir included in said line and two further electrically conducting elements in said liquid collecting reservoir, said two further electrically conducting elements being in communication with a further electronic circuit, said specific electric resistance ($R_{SW}$) being determined via said further electronic circuit on the basis of the distance between said further electrically conducting elements, the volume of the liquid in said liquid collecting reservoir and the conductivity of the liquid measured.

12. A quantity meter as claimed in claim 1 wherein said line comprises a pipe-line in which milk flows, and said line being included in a system for milking an animal.

13. A quantity meter as claimed in claim 12 including a system for milking an animal comprising:
   a teat cup connected to a teat of said animal, and
   a buffer vessel for collecting said milk obtained via teat cup, said pipe-line comprising means by which said teat cup is connected to said buffer vessel, said quantity meter being operatively connected to said pipe-line.

14. A quantity meter as claimed in claim 12, comprising a computer, and means for automatically milking said animal.

15. A quantity meter as claimed in claim 14, wherein said means for automatically milking said animal comprises a milking robot, said milking robot comprises means for automatically connecting said teat cup to said teat of said animal, said means for automatically disconnecting said teat cup from said teat.

16. A quantity meter as claimed in claim 14 wherein said first electronic circuit is operatively connected to said computer.

17. A quantity meter as claimed in claim 14 wherein said quantity meter further comprises a conductivity sensor included in said pipe-line, said conductivity sensor comprises a liquid collecting reservoir included in said pipe-line and two further electrically conducting elements disposed in said liquid collecting reservoir, said two further electrically conducting elements being in communication with a further electronic circuit, via said further electronic circuit, said specific electric resistance ($R_{SW}$) being determined on the basis of the distance between said further electrically conducting elements, the volume of the liquid in said liquid collecting reservoir and the conductivity of the liquid measured, said further electronic circuit being operatively connected to said computer.

18. A system for automatically milking an animal comprising:
   a milking robot, a computer, a milk glass, a milk tank, a pipe-line system, and a quantity meter,
   said milking robot controlled by said computer,
   said milking robot comprising a teat cup, means for connecting and disconnecting said teat cup to and from a teat of said animal, means for obtaining milk from said teat via said teat cup, and means for delivering said milk to said milk glass,
   said milk glass comprising means of deaerating said milk and means for delivering said milk to said milk tank,
   said means for delivering said milk to said milk glass and said means for delivering said milk to said milk tank comprising said pipe-line system.
   said pipe-line system comprising a line disposed obliquely downwardly,
   said line comprising said quantity meter,
   said quantity meter comprising a first electrically conducting element, a second electrically conducting element, a third electrically conducting element, a conductivity sensor and a microprocessor,
   said first and second and third electrically conducting elements operatively connected to said line in electrical contact with said milk in said line,
   said first electrically conducting element comprising a first conducting junction tube, said second electrically conducting element comprising a second conducting junction tube, and said third electrically conducting element comprising a third conducting junction tube,
   said first conducting junction tube separated from said second conducting junction tube via a non-conducting junction tube,
   said second conducting junction tube separated from said third conducting junction tube by a distance (l) via a further non-conducting junction tube,
   both said non-conducting junction tubes comprising an internal diameter which is substantially equal to an internal diameter of the three said conducting junction tubes,
   said second conducting junction tube disposed, in respect to the flow of said milk in said line, downstream from said first conducting junction tube,
   said third conducting junction tube disposed, in respect to the flow of said milk in said line, downstream from said second conducting junction tube,
   said first electrically conducting element, said second electrically conducting element and said third electrically conducting element operatively connected to said microprocessor,
   said conductivity sensor comprising a milk collecting reservoir, a fourth electrically conducting element and a fifth electrically conducting element,
   said milk collecting reservoir disposed in said line and containing a volume of said milk which is constant,
   said fourth electrically conducting element and said fifth electrically conducting element disposed in said milk collecting reservoir fixedly separated from each other and in operative contact with said milk in said milk collecting reservoir,
   said fourth electrically conducting element and said fifth electrically conducting element operatively connected to said microprocessor,
   said microprocessor comprising
      means for deriving a span of time ($\Delta t$) between the moment a unit of said milk contacts said first and second electrically conducting element and the moment said unit of said milk thereafter contacts said third electrically conducting element,
      means of measuring the electric conductivity of said milk (G),
      means for calculating the flow rate of said milk (v),
      means for calculating the specific electrical resistance ($R_{SW}$) of said milk in said milk collecting reservoir,
      means for storing the value of said distance (l),
      means for approximately calculating the quantity of milk (V) which has flowed through said line on the basis of the mathematical expression:

$$V = R_{SW} \cdot l \cdot v \cdot G \cdot (\Delta t + l/v),$$

said microprocessor operatively connected to said computer.

19. A system for milking animals comprising a teat cup for being connected to the teat of said animal to be milked, a buffer vessel for collecting milk from said teat cup, a milk tank connected to said buffer vessel, a pipeline comprising connection means between said buffer vessel and said milk tank, a quantity meter for measuring the quantity of milk passing through said pipeline, said quantity meter comprising an electronic circuit, a passageway for receiving milk flowing through said pipeline, three electrically conducting elements disposed linearly in said passageway, said electrically conducting elements being spaced apart and being in connection with said electronic circuit, said electronic circuit determining:

the electric conductivity of milk flowing through said passageway when said flowing milk bridges at least two of said electrically conducting elements;

the rate of flow of said milk when said flowing milk bridges at least three of said electrically conducting elements; and the specific electric resistance of the milk flowing through said passageway; and said electronic circuit calculating on the basis thereof the quantity of milk flowing through said pipeline.

* * * * *